United States Patent Office 3,456,038
Patented July 15, 1969

3,456,038
BLENDS OF ETHYLENE-PROPYLENE RUBBER AND ATACTIC POLYPROPYLENE
Neil F. Newman, Elizabeth, and Rudolph S. Wilsher, Kendall Park, N.J., assignors to Esso Research and Engineering Company, a corporation of Delaware
No Drawing. Continuation of application Ser. No. 349,477, Mar. 4, 1964. This application July 13, 1967, Ser. No. 653,271
Int. Cl. C08g 29/12
U.S. Cl. 260—878
8 Claims

ABSTRACT OF THE DISCLOSURE

A process for vulcanizing an elastomer blend of a major portion of ethylene-propylene rubber and about 20 to about 40 wt. percent based on said rubber plus atactic polypropylene, of atactic polypropylene which comprises blending said elastomer blend with an organic peroxide free radical initiator, an unsaturated organic compound, a vulcanizing amount of sulfur and a metal oxide. The vulcanized compositions so formed are useful elastomers having tensile strengths equivalent to ethylene-propylene rubber.

---

The present invention relates to blends of hydrocarbon polymers. More particularly, it concerns polymer mixtures containing a major proportion of an ethylene-propylene type rubber and a minor proportion of atactic polypropylene and vulcanizates thereof.

This application is a streamlined continuation of application Ser. No. 349,477, filed Mar. 4, 1964, now abandoned.

Essentially saturated elastomers, such as ethylene-propylene rubber (EPR), are useful in applications where ozone resistance and inertness toward chemicals are needed. The utilization of these rubbers could be greatly increased if they could be blended with other polymers without adversely affecting their ability to resist chemical attack.

It has been surprisingly found that atactic polypropylene can be mixed with polyolefin rubbers, especially EPR, to make a product which is capable of being vulcanized with conventional curing agents, such as organic peroxides and halogenated hydrocarbons. Additionally it has been discovered that by adding certain unsaturated compounds to the blend, satisfactory vulcanizates can be obtained even when as much as ⅓ of the polymer in the composition comprises the atactic homopolymer.

The best results are achieved when the amount of atactic polymer in the mixture is less than about 30%, based on the total weight of polymer. Excellent results are gotten, for example, when a blend of 80 to 90 parts by wt. of EPR and 10 to 20 parts by wt. of solid atactic polypropylene are mixed with a small amount of an unsaturated organic compound, e.g., acrylic acid, and cured with dicumyl peroxide and sulfur. The unsaturated compound seems to enhance the vulcanization process and often permits the use of larger amounts of atactic polymer without unduly affecting the properties of the cured elastomer.

Ethylene-propylene rubbers are described in the literature and their preparation does not form any part of this invention. Likewise, atactic polypropylene is also a well known polymer. These high molecular weight polymers are made by the so-called "low pressure" method, e.g., see Belgian Patent 533,362.

The ethylene-propylene rubber is substantially amorphous and contains about 20 to 20 mole percent, preferably about 50 mole percent combined ethylene. It should be essentially free of catalyst residues, e.g., an ash content of not more than 0.3 wt. percent. Typically it has a viscosity average molecular weight of 100,000 to 2 million as measured in Decalin at 125° C. by the ASTM–D–1601–58T method. The copolymer has a crystallinity of not more than 10% and is a substantially linear, regular head-to-tail polymer.

The atactic polypropylene is a solid plastic mass having a viscosity average molecular weight of about 1,000 to 1 million. It may have a crystallinity, as measured by n-heptane insolubility, as high as 20%, but preferably the homopolymer has a crystallinity of substantially zero.

The EPR and atactic polypropylene can be mixed by any convenient method. In general the two polymers are blended either in a Banbury or in a rubber mill at an elevated temperature, e.g., 100° F. to 400° F. In most instances the rubber and atactic polymer are mixed at about 130° to 350° F. for from about 1 minute to 60 minutes, depending upon the temperature and efficiency of the mixing apparatus. When using a Banbury mixer, a homogeneous composition can be obtained in about 3 to 20 minutes at pressures of up to about 50 p.s.i.g. If a filler, such as carbon black or a siliceous substance is to be used, it is often best to add the filler to the EPR prior to adding the atactic polypropylene.

In addition to utilizing carbon blacks and mineral fillers, stabilizing agents, plasticizers and lubricants as well as other additives used in the rubber industry can be admixed with the two polymers. The amounts of these ingredients used to formulate the rubber composition will vary with the particular end use. Usually about 20 to 80 phr. (parts by weight per 100 parts by weight of rubber) of finely-divided fillers is used and about 1 to 5 phr. of a lubricant or plasticizer, such as calcium stearate, is also utilized. The stabilizers and pigments usually are used in amounts of 0.1 to 2 phr.

As indicated above, any of the methods known for cross linking EPR can be used to cure the compositions of the present invention. For example, free radical producing compounds (free radical initiators), especially di-alpha-cumyl peroxide, can be employed in small amounts, e.g., 0.2 to 10 phr., preferably 1 to 5 phr., to vulcanize the compounded polymer mixture. In addition to the aforementioned peroxide, other organic peroxides, such as di-t-butyl peroxide, 2,5 - dimethyl - 2,5 - di(t - butyl peroxy) hexane, 1,3-bis(α-t-butyl peroxyisopropyl)benzene, 1,4-bis(α-t-butyl peroxyisopropyl) benzene and 2,5-dimethyl-2,5-di(t-butyl peroxy)hexyne-3, can also be used. Other free radical producing cross linking systems that can be employed are described in U.S. Patents 3,012,016 and 3,012,020. The time required to effect a cure with these peroxides varies. Generally speaking, the vulcanization should be carried out at a temperature at or above the decomposition temperature of the organic peroxide for a time equal to about 3 to 15 times the half-life of the peroxide at that temperature.

Still other curing systems that can be employed are described in Rubber Chemistry Technology, volume 34, pages 133 et seq., and pages 1091 et seq. (1962). These cross linking compounds are highly or perchlorinated hydrocarbons, such as octachlorocyclopentene (OCCP). The perchlorinated compounds are most effective when used in combination with small amounts of sulfur and certain metal oxides, e.g. iron oxide.

When a peroxide is used to cure the polymer blend, it is particularly advantageous to use a small amount of an unsaturated relatively low molecular weight coagent, such as tris(2-methoxyethoxy)vinyl silane, tris(2-methoxyethoxy)allyl silane, various acrylates, such as polyvalent metal salts of α, β unsaturated acids, e.g. zinc acrylate, calcium methacrylate, poly 1,4-butadiene, epoxidized polybutadiene and vinyl ethers, such as butanediol divinyl ether and diethylene glycol divinyl ether. Acrylic acid and ethylene dimethacrylate have been found to be especially useful. Satisfactory results are obtained with 0.05 to 25 phr. of unsaturated coagent. The amount of these unsaturated compounds needed in order to effect a good vulcanization will depend on the amount of atactic homopolymer employed. For example, when about 30 to 40 wt. percent atactic polypropylene (based on the total weight of the polymer) is used in the blend, it is generally necessary to use about 2 to 5 phr. of a polyfunctional, cocurative compound, such as acrylic acid, in order to obtain a product having a tensile strength substantially the same as the unblended EPR.

The polymer mixtures can be cured at temperatures ranging from about 200° up to 450° F. at pressures of about 1 to 5000 p.s.i.g. Depending upon the severity of the conditions, the cure time can be as short as a few seconds and as long as 2 hours. Generally the test results are obtained when the rubbery compositions are vulcanized at about 280° to 350° F. for approximately 10 to 40 minutes under superatmospheric pressure.

The blends prepared in accordance with the present invention are useful as coatings for wire, in hoses, gaskets, floor tiles, weather stripping and other applications where good chemical and electrical properties are needed.

The following examples are submitted in order to illustrate specific embodiments of the invention:

Example 1

Ethylene-propylene rubber (EPR) containing 53 mole percent combined ethylene and 37 mole percent combined propylene and having a Mooney viscosity of 212° F. of 40±5 and a viscosity average molecular weight of 900,000 was blended with atactic polypropylene, which had no measurable crystallinity and had a viscosity average molecular weight of 100,000, in a Banbury at 300° F. for 8 minutes in accordance with the following recipes:

TABLE

| | Parts by weight | |
|---|---|---|
| | Recipe #1 | Recipe #2 |
| Ethylene-propylene rubber (EPR) | 100 | 83 |
| Atactic polypropylene | 0 | 17 |
| Acrylic acid | 3 | 3 |
| HiSil 233 (precipitated hydrated silica, 84% SiO$_2$) | 50 | 50 |
| Calcium stearate | 1 | 1 |
| Zinc oxide | 5 | 5 |
| Di-α-cumyl peroxide (40% active) | 7 | 7 |
| Sulfur | 0.3 | 0.3 |

When the recipes #1 and #2 were heated for 30 minutes at 320° F. under a pressure of 1200 p.s.i.g., the press cured vulcanizate obtained with Recipe #1 had a tensile strength of 2,000 p.s.i. and an elongation of 510% whereas the cured polymer matter in accordance with Recipe #2 had a tensile strength of 2,150 p.s.i. and an elongation of 580%.

Example 2

When ethylene-propylene rubber (EPR) and atactic polypropylene were compounded in accordance with Recipe #2, except that 33 parts by weight polypropylene was used and 67 parts by weight of the rubber was utilized, the cured product had a tensile strength of 2,180 p.s.i. and an elongation of 780%.

Example 3

When Recipe #2 in Example 1 was repeated using 67 parts by weight EPR and 33 parts by weight atactic polypropylene and ethylene dimethacrylate in place of acrylic acid, a vulcanizate having a tensile strength of 1,950 p.s.i. and an elongation of 550% was obtained. When this same recipe was cured in the absence of unsaturated compounds, such as an acrylate, the tensile strength of the vulcanizate is about 1,600 p.s.i. and the elongation is about 830%. Thus, the unsaturated coagent is useful in obtaining a strong vulcanizate with EPR blends containing large proportions of atactic polypropylene.

Example 4

When the EPR used in Example 1 is compounded as follows with a chlorinated curing agent and press cured for 60 minutes at 320° F., a vulcanizate is obtained which possesses about the same tensile strength as a corresponding vulcanizate which does not contain any solid atactic polypropylene:

| | Parts by weight |
|---|---|
| Ethylene-propylene rubber | 67 |
| Atactic polypropylene | 33 |
| HiSil 233 | 60 |
| Sulfur | 1 |
| OCCP [1] | 5 |
| Iron naphthenate | 5 |

[1] Octachlorocyclopentene.

Only atactic polypropylene can be effectively used in combination with EPR. Highly crystalline polypropylenes have been found to be wholly unsatisfactory for the purposes of the present invention. One reason is that crystalline polypropylene has a high melting point and thus is not compatible with EPR at conventional curing temperatures, e.g. 320° F. Furthermore, it is known that certain forms of crystalline polypropylene, e.g. isotactic polypropylene, depolymerize when admixed at elevated temperatures with free radical producing curing agents, especially di-α-cumyl peroxide. In contrast to the poor results gotten with these crystalline polypropylene, atactic polypropylene (i.e., polypropylene which is soluble in boiling normal heptane and boiling diethyl ethers) is compatible with EPR and, as shown above, produces the vulcanizate which has highly desirable properties.

It is not intended to restrict the present invention to the foregoing examples which are given merely to demonstrate some of the embodiments of the invention. It should only be limited by the appended claims in which it is maintained to claim all the novelty inherent in the invention, as well as all the modifications and equivalents coming within the scope and sphere of the invention.

What is claimed is:

1. A process for vulcanizing an elastomer blend of a major portion of ethylene propylene rubber and about 20 to about 40 wt. percent, based on said rubber plus atactic polypropylene, of atactic polypropylene which comprises blending said elastomer blend with:
    (a) about 0.2 to 10 phr., based on said elastomer blend, of an organic peroxide free radical initiator where the organic peroxide is used in conjunction with an unsaturated compound selected from the group consisting of acrylic acid, tris(2-methoxy ethoxy) vinyl silane, tris (2-methoxy ethoxy) allyl silane, zinc acrylate, calcium acrylate, vinyl ethers and ethylene dimethacrylate,
    (b) a vulcanizing amount of sulfur, and
    (c) a metal oxide; and
heating the resultant blend at an elevated temperature until said blend is cured.

2. The process of claim 1 wherein the free radical initiator is about 1 to about 5 phr., based on said elastomer blend, of dicumyl peroxide, the unsaturated compound is about 0.05 to about 25 phr., based on said elastomer blend, or acrylic acid, and the metal compound is zinc oxide.

3. A vulcanizable composition comprising:
    (a) a major portion of ethylene propylene rubber;
    (b) about 20 to about 40 wt. percent, based on said rubber plus atactic propylene, of atactic polypropylene;
    (c) about 0.2 to about 10 phr., based on the ethylene propylene rubber plus atactic polypropylene, of an organic peroxide free radical initiator where the organic peroxide is used in conjunction with an unsaturated compound selected from the group consisting of acrylic acid, tris(2-methoxy ethoxy) vinyl silane, tris(2-methoxy ethoxy) allyl silane, zinc acrylate, calcium acrylate, vinyl ethers and ethylene dimethacrylate;

(d) a vulcanizing amount of sulfur; and
(e) a metal oxide.

4. The composition of claim 3 wherein the free radical initiator is about 1 to about 5 phr., based on the ethylene propylene rubber plus atactic polypropylene, of dicumyl peroxide in conjunction with about 0.05 to about 25 phr., based on the ethylene propylene rubber plus atactic polypropylene, of acrylic acid and the metal compound is zinc oxide.

5. A process for vulcanizing an elastomer blend of a major portion of ethylene propylene rubber and about 20 to about 40 wt. percent, based on said rubber, of atactic polypropylene which comprises blending the elastomer blend with:

(a) a vulcanizing amount of an organic peroxide,
(b) about 0.05 to about 25 phr., based on the elastomer blend of an unsaturated compound selected from the group consisting of acrylic acid, tris(2-methoxy ethoxy) vinyl silane, tris(2-methoxy ethoxy) allyl silane, zinc acrylate, calcium acrylate, vinyl ethers and ethylene dimethacrylate,
(c) a vulcanizing amount of sulfur, and
(d) zinc oxide; and heating the resulting blend at an elevated temperature until said blend is cured.

6. The process of claim 5 wherein the organic peroxide is dicumyl peroxide and the unsaturated compound is acrylic acid.

7. The process of claim 1 wherein the atactic polypropylene is present at about 30 to about 40 wt. percent based on the rubber plus atactic polypropylene.

8. The composition of claim 3 wherein the atactic polypropylene is present at about 30 to about 40 wt. percent based on the rubber plus atactic polypropylene.

References Cited

UNITED STATES PATENTS

| 3,240,727 | 3/1966 | Scalari et al. | 260—2.5 |
| 3,256,366 | 6/1966 | Corbelli | 260—878 |
| 3,312,757 | 4/1967 | McRitchie | 260—878 |
| 3,236,917 | 2/1966 | Natta et al. | 260—878 |

OTHER REFERENCES

Natta et al.: Rubber and Plastics Age, January 1961, pp. 53–58, 260/88.2.

GEORGE F. LESMES, Primary Examiner

C. J. SECCURO, Assistant Examiner

U.S. Cl. X.R.

117—128.4; 260—41, 827, 836, 889, 897